(12) United States Patent
Vildosola

(10) Patent No.: US 6,209,875 B1
(45) Date of Patent: Apr. 3, 2001

(54) DOMINO PLAYING PIECE SYSTEM

(76) Inventor: Luis M. Vildosola, 1217 Miramar Walk, Oxnard, CA (US) 93035

( * ) Notice: Subject to any disclaimer, the term of this patent is extended or adjusted under 35 U.S.C. 154(b) by 0 days.

(21) Appl. No.: 09/234,696

(22) Filed: Jan. 21, 1999

(51) Int. Cl.[7] .................................................. A63F 9/20
(52) U.S. Cl. ...................... 273/302; 273/308; D21/391; D21/383; 434/205
(58) Field of Search ........................... 273/293, 299, 273/302, 308, 294; D21/391, 376, 380, 381, 383, 384; 434/205

(56) References Cited

U.S. PATENT DOCUMENTS

| | | | |
|---|---|---|---|
| 3,061,947 | * 11/1962 | Faudree | 434/205 |
| 4,358,274 | * 11/1982 | Chase | 434/205 |

FOREIGN PATENT DOCUMENTS

| | | | |
|---|---|---|---|
| 2338728 | * 8/1977 | (FR) | 273/294 |
| 1358698 | * 7/1974 | (GB) | 273/242 |

* cited by examiner

Primary Examiner—Benjamin H. Layno

(57) ABSTRACT

A new domino playing piece system for helping children learn and recognize numbers and animals. The inventive device includes a plurality of playing pieces with each playing piece comprising a display surface having first and second regions and a border between the first and second regions. The display surface of the playing piece has numeric indicia displayed thereon. Each of the first and second regions of the playing piece has an illustration displayed thereon with each illustration representing a numeric value. The sum of the numeric values of the illustrations of the first and second regions equals the value of the numeric indicia displayed on the playing piece.

1 Claim, 5 Drawing Sheets

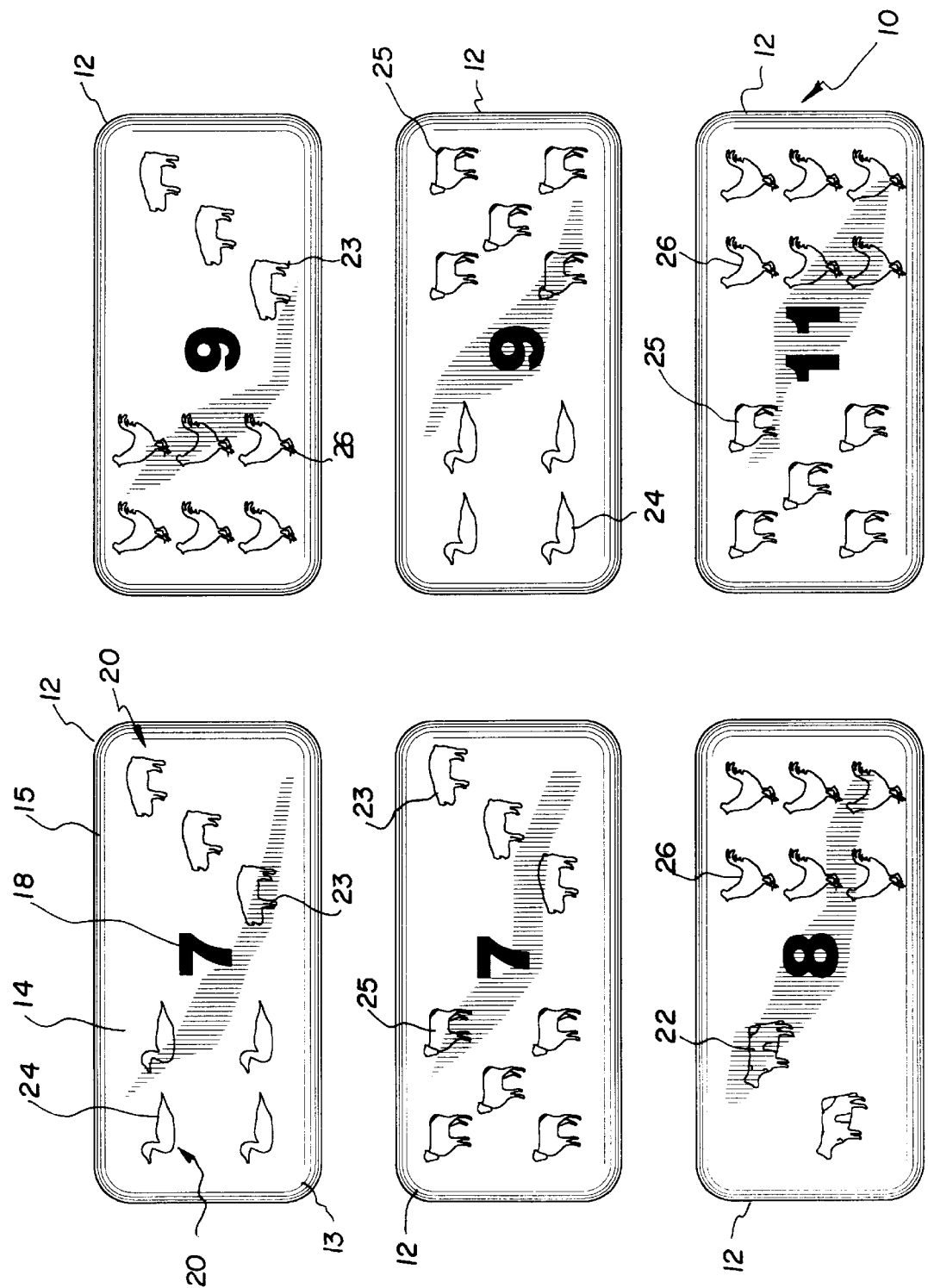

DOMINO PLAYING PIECE SYSTEM

BACKGROUND OF THE INVENTION

1. Field of the Invention

The present invention relates to domino games and more particularly pertains to a new domino playing piece system for helping children learn and recognize numbers and animals.

2. Description of the Prior Art

The use of domino games is known in the prior art. More specifically, domino games heretofore devised and utilized are known to consist basically of familiar, expected and obvious structural configurations, notwithstanding the myriad of designs encompassed by the crowded prior art which have been developed for the fulfillment of countless objectives and requirements.

Known prior art domino games include U.S. Pat. No. 4,004,812; U.S. Pat. No. 4,225,139; U.S. Pat. No. 4,285,522; U.S. Pat. No. 4,239,231; U.S. Pat. No. 4,968,040; and U.S. Pat. No. Des. 328,107.

While these devices fulfill their respective, particular objectives and requirements, the aforementioned patents do not disclose a new domino playing piece system. The inventive device includes a plurality of playing pieces with each playing piece comprising a display surface having first and second regions and a border between the first and second regions. The display surface of the playing piece has numeric indicia displayed thereon. Each of the first and second regions of the playing piece has an illustration displayed thereon with each illustration representing a numeric value. The sum of the numeric values of the illustrations of the first and second regions equals the value of the numeric indicia displayed on the playing piece.

In these respects, the domino playing piece, system according to the present invention substantially departs from the conventional concepts and designs of the prior art, and in so doing provides an apparatus primarily developed for the purpose of helping children learn and recognize numbers and animals.

SUMMARY OF THE INVENTION

In view of the foregoing disadvantages inherent in the known types of domino games now present in the prior art, the present invention provides a new domino playing piece system construction wherein the same can be utilized for helping children learn and recognize numbers and animals.

The general purpose of the present invention, which will be described subsequently in greater detail, is to provide a new domino playing piece system apparatus and method which has many of the advantages of the domino games mentioned heretofore and many novel features that result in a new domino playing piece system which is not anticipated, rendered obvious, suggested, or even implied by any of the prior art domino games, either alone or in any combination thereof.

To attain this, the present invention generally comprises a plurality of playing pieces with each playing piece comprising a display surface having first and second regions and a border between the first and second regions. The display surface of the playing piece has numeric indicia displayed thereon. Each of the first and second regions of the playing piece has an illustration displayed thereon with each illustration representing a numeric value. The sum of the numeric values of the illustrations of the first and second regions equals the value of the numeric indicia displayed on the playing piece.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new domino playing piece system apparatus and method which has many of the advantages of the domino games mentioned heretofore and many novel features that result in a new domino playing piece system which is not anticipated, rendered obvious, suggested, or even implied by any of the prior art domino games, either alone or in any combination thereof.

It is another object of the present invention to provide a new domino playing piece system which may be easily and efficiently manufactured and marketed.

It is a further object of the present invention to provide a new domino playing piece system which is of a durable and reliable construction.

An even further object of the present invention is to provide a new domino playing piece system which is susceptible of a low cost of manufacture with regard to both materials and labor, and which accordingly is then susceptible of low prices of sale to the consuming public, thereby making such domino playing piece system economically available to the buying public.

Still yet another object of the present invention is to provide a new domino playing piece system which provides in the apparatuses and methods of the prior art some of the advantages thereof, while simultaneously overcoming some of the disadvantages normally associated therewith.

Still another object of the present invention is to provide a new domino playing piece system for helping children learn and recognize numbers and animals.

Yet another object of the present invention is to provide a new domino playing piece system which includes a plurality of playing pieces with each playing piece comprising a display surface having first and second regions and a border between the first and second regions. The display surface of the playing piece has numeric indicia displayed thereon. Each of the first and second regions of the playing piece has an illustration displayed thereon with each illustration representing a numeric value. The sum of the numeric values of the illustrations of the first and second regions equals the value of the numeric indicia displayed on the playing piece.

Still yet another object of the present invention is to provide a new domino playing piece system that relates each number used on a domino playing piece to a different animal illustration.

Even still another object of the present invention is to provide a new domino playing piece system that helps children learn words and numbers through picture association.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic side view of several playing pieces of the present invention.

DESCRIPTION OF THE PREFERRED EMBODIMENT

Figure 1:
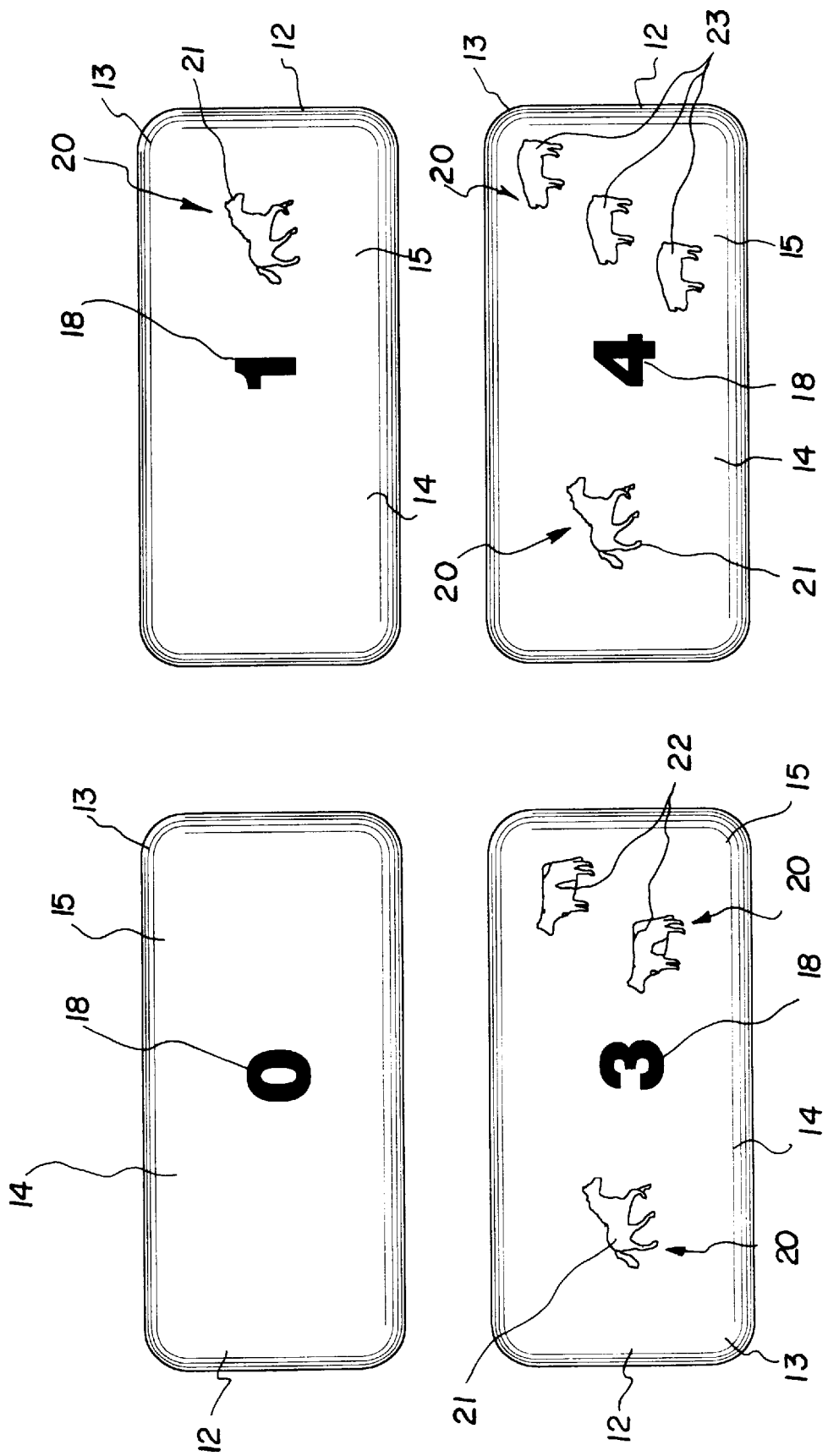
FIG. 1 is a schematic side view of a new domino playing piece system according to the present invention.
Figure 2:
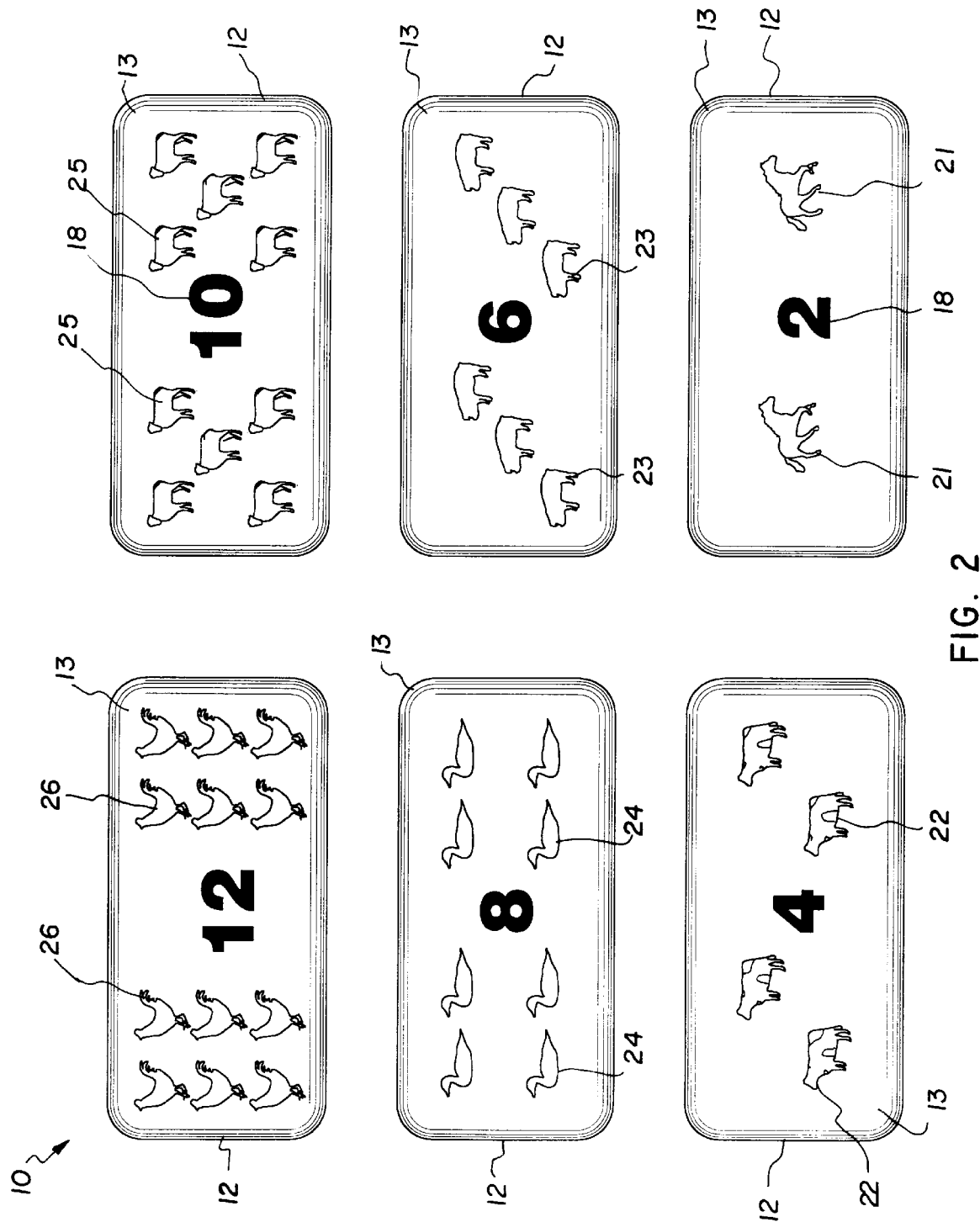
FIG. 2 is a schematic side view of several playing pieces of the present invention.
Figure 3:
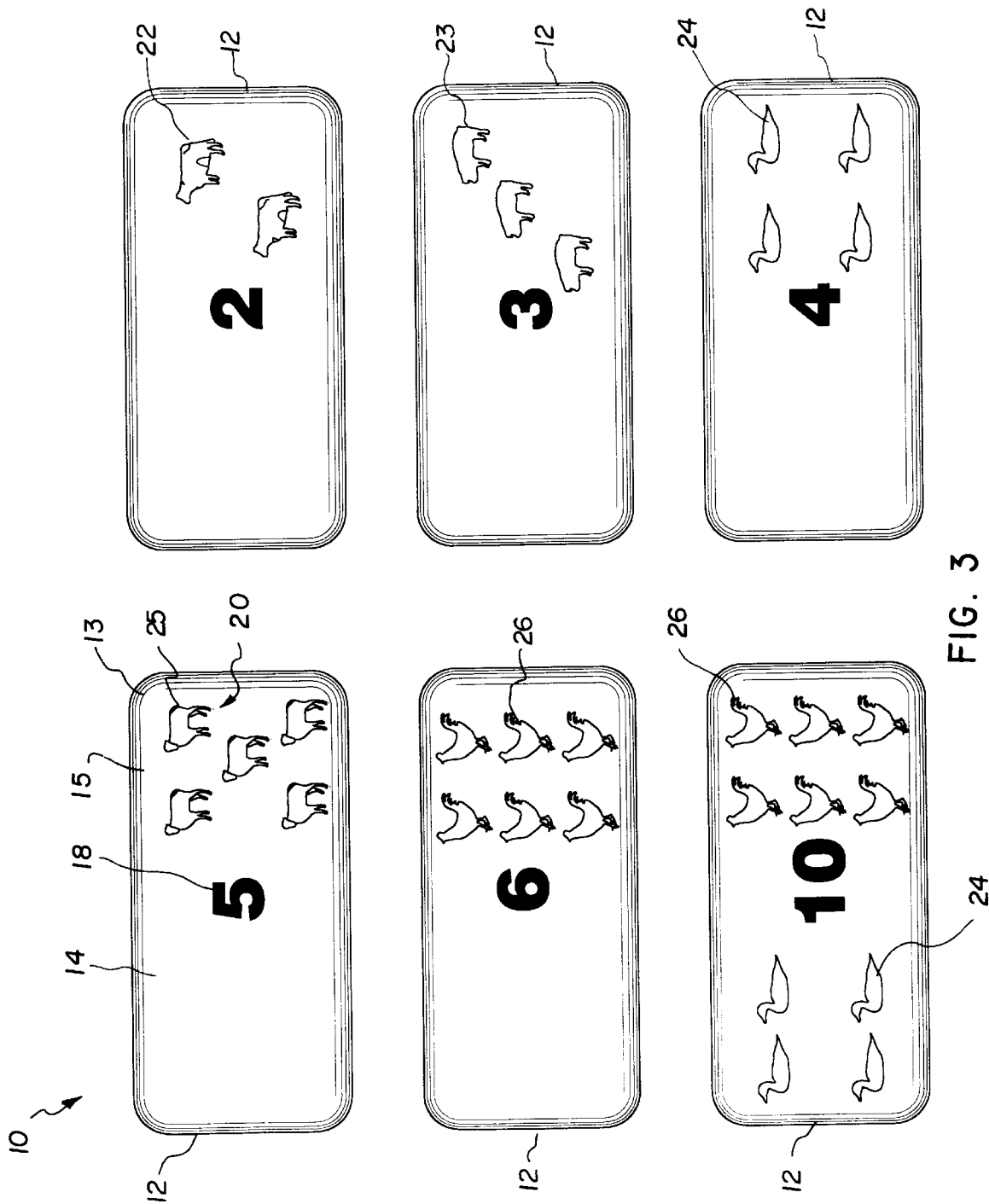
FIG. 3 is a schematic side view of several playing pieces of the present invention.
Figure 4:
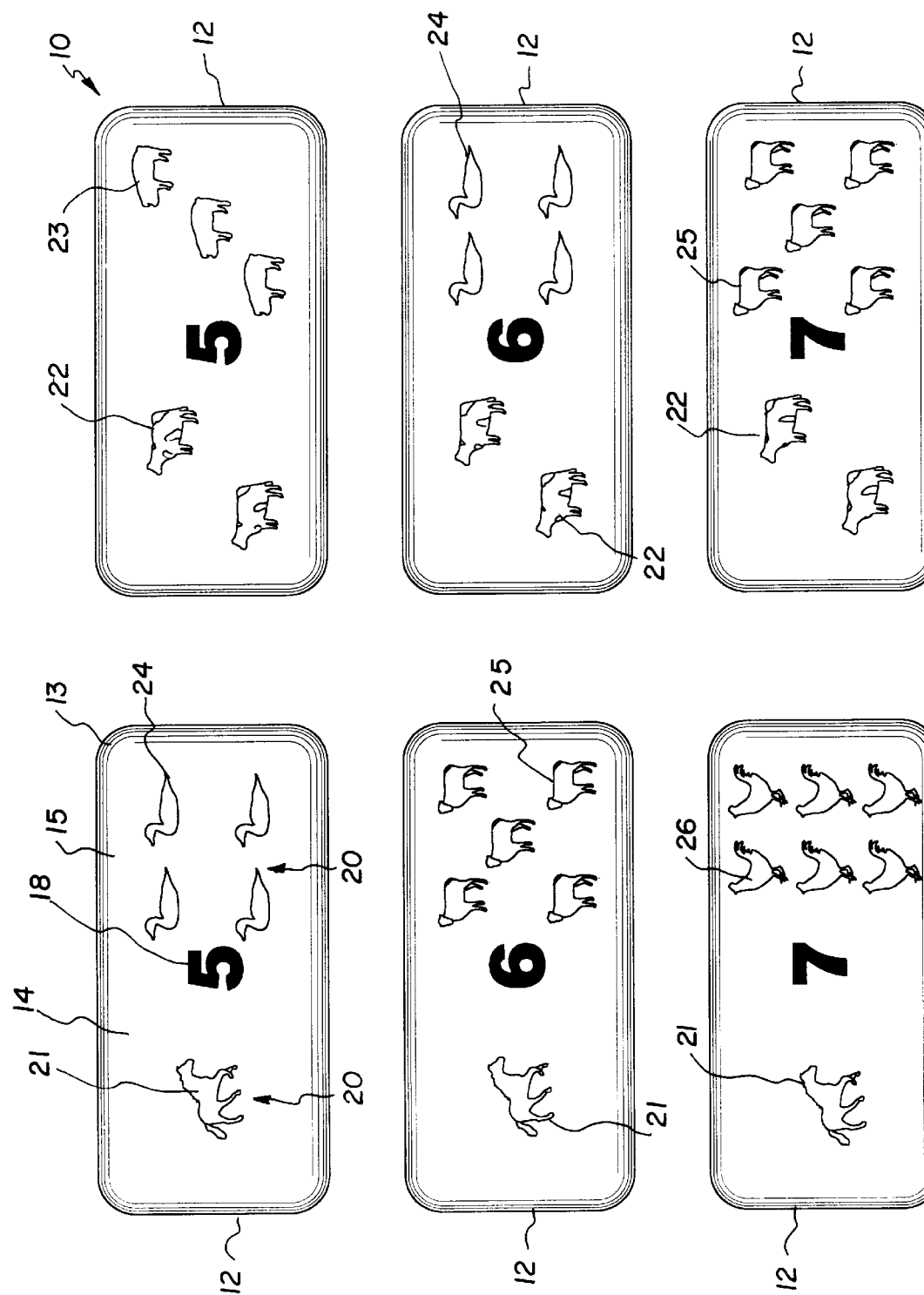
FIG. 4 is a schematic side view of several playing pieces of the present invention.

With reference now to the drawings, and in particular to FIGS. 1 through 5 thereof, a new domino playing piece system embodying the principles and concepts of the present invention and generally designated by the reference numeral 10 will be described.

As best illustrated in FIGS. 1 through 5, the domino playing piece system 10 generally comprises a plurality of playing pieces 12 with each playing piece 12 comprising a display surface 13 having first and second regions 14,15 and a border between the first and second regions 14,15. The display surface 13 of the playing piece 12 has numeric indicia 18 displayed thereon. Each of the first and second regions 14,15 of the playing piece 12 has an illustration 20 displayed thereon. Each illustration 20 represents a numeric value. The sum of the numeric values of the illustration 20s of the first and second regions 14,15 equals the value of the numeric indicia 18 displayed on the playing piece 12.

In use, the domino playing pieces 12 of the system 10 are used to play domino games just like conventional dominoes. Preferably the playing pieces 12 are generally rectangular in shape as conventional domino pieces. In closer detail, each of the playing pieces 12 includes a generally rectangular display surface 13 which is divided into first and second regions 14,15 with a border between the first and second regions 14,15. The border of the display surface 13 of the playing piece 12 is preferably centrally located on the display surface 13 of the playing piece 12. The display surface 13 of the playing piece 12 has numeric indicia 18 displayed thereon. Preferably, the numeric indicia 18 is located at the border of the display surface 13 of the playing piece 12. Like in conventional dominoes, preferably, the numeric indicia 18 is an integer from 1 to 12.

As illustrated in the Figures, each of the first and second regions 14,15 of the playing piece 12 has an illustration 20 displayed thereon with each illustration 20 representing a numeric value. Preferably, the sum of the numeric values of the illustrations 20 of the first and second regions 14,15 equals the value of the numeric indicia 18 displayed on the playing piece 12. Ideally, the numeric value of each of the illustrations 20 is an integer from 0 to 6.

Even more preferably, each illustration 20 comprises a number of FIGS. 21,22,23,24,25,26 with the number of figures of each illustration 20 equal to the numeric value of the associated illustration 20. Ideally, each of the figures of each of the illustrations 20 depicts an animal, although other designs may be used. Preferably, each illustration 20 has a particular numeric value which unique with respect to other illustrations 20 representing other numeric values. That is, the type of animal depicted by the figures of an illustration 20 of a particular value is unique with respect to the type of animal depicted by the figures of the other illustrations 20 representing different numeric values.

In the preferred embodiment, an illustration 20 representing a numeric value of 0 has 0 figures. Preferably, an illustration 20 representing a numeric value of 1 has one FIG. 21, ideally, this figure depicts a horse 21. Preferably, an illustration 20 representing a numeric value of 2 has two FIGS. 22, ideally, each of these figures depict a cow 22. Preferably, an illustration 20 representing a numeric value of 3 has three FIGS. 23, that ideally each depict a pig 23. Preferably, an illustration 20 representing a numeric value of 4 has four FIGS. 24. Ideally, each of the FIGS. 24 of an illustration 20 representing the numeric value of 4 depicts a duck 24. Preferably, an illustration 20 has a numeric value of 5 has five FIGS. 25, that ideally each depict a sheep 25. Finally, an illustration 20 representing a numeric value of 6 has six FIGS. 26 with each, ideally, depicting a chicken 26.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A domino playing piece system, comprising:

a plurality of playing pieces each being generally rectangular in shape;

wherein each of said playing pieces comprises:

a generally rectangular display surface having first and second regions and a border between said first and second regions, said border of said display surface of said playing piece being centrally located on said display surface of said playing piece;

said display surface of said playing piece having numeric indicia displayed thereon, wherein said numeric indicia is located at said border of said display surface of said playing piece such that said numeric indicia is not obscured by a finger of a user when said playing piece is being placed, wherein said numeric indicia is an integer from 1 to 12;

each of said first and second regions of said playing piece having an illustration displayed thereon, each illustration representing a numeric value, wherein the sum of said numeric values of said illustrations of said first and second regions equals the value of said numeric indicia displayed on said playing piece, wherein the numeric value of each of said illustrations is an integer from 0 to 6;

wherein each illustration comprises a number of figures, the number of figures of each illustration being equal to the numeric value of the associated illustration;

wherein each of said figures of each of said illustrations depicts an animal;

wherein an illustration having a numeric value of 0 has 0 figures;

wherein an illustration having a numeric value of 1 has 1 figure, wherein each of said figures of an illustration having the numeric value of 1 depicts a horse;

wherein an illustration having a numeric value of 2 has 2 figures, wherein each of said figures of an illustration having the numeric value of 2 depicts a cow;

wherein an illustration having a numeric value of 3 has 3 figures, wherein each of said figures of an illustration having the numeric value of 3 depicts a pig;

wherein an illustration having a numeric value of 4 has 4 figures, wherein each of said figures of an illustration having the numeric value of 4 depicts a duck;

wherein an illustration having a numeric value of 5 has 5 figures, wherein each of said figures of an illustration having the numeric value of 5 depicts a sheep; and wherein an illustration having a numeric value of 6 has 6 figures, wherein each of said figures of an illustration having the numeric value of 6 depicts a chicken;

said plurality of playing pieces include a playing piece having a first illustration representing a first numeric value on its first region, and having a second illustration representing a second numeric value, different from said first numeric value, on its second region, wherein said playing piece having depictions of two different animals.

* * * * *